United States Patent [19]

Owens

[11] 4,402,339
[45] Sep. 6, 1983

[54] LOCKABLE VALVE FOR HYDRAULIC SYSTEM

[76] Inventor: Carl H. Owens, 1652 River Bluff Rd., Jacksonville, Fla. 32211

[21] Appl. No.: 210,721

[22] Filed: Nov. 26, 1980

[51] Int. Cl.³ ............................................. F16K 35/06
[52] U.S. Cl. .................................. 137/384.6; 70/176; 70/179; 60/494
[58] Field of Search ................... 91/418, 449; 60/494; 70/175, 176, 179, 181; 137/383, 384.2, 384.4, 384.6, 384.8

[56] References Cited

U.S. PATENT DOCUMENTS

| 2,845,943 | 8/1958 | Perkins | 137/384.6 |
| 3,401,545 | 9/1908 | Fraser | 137/384.4 |
| 3,580,623 | 5/1971 | Peters | 70/175 |
| 3,771,547 | 11/1973 | Coleman | 137/384.6 |
| 3,987,627 | 10/1976 | Lindstrom | 60/494 |

*Primary Examiner*—A. Michael Chambers

*Attorney, Agent, or Firm*—Arthur G. Yeager

[57] ABSTRACT

A lockable valve in a hydraulic system comprising a valve body, a cylinder, a piston in the cylinder, and an inlet port and two outlet ports, one of the outlet ports leading to a bypass line and the other of the outlet ports leading to an operational hydraulic cylinder; the piston being slidable in the cylinder to selectively close either of the outlet ports. The valve includes a manually lockable means to lock the piston in the position in which the outlet port to the hydraulic cylinder is closed and being spring biased to close the outlet port leading to the bypass line and simultaneously to open the outlet port leading to the hydraulic cylinder when the lockable means is unlocked. An additional safeguard against the theft of vehicles employing hydraulic systems to power auxiliary equipment is provided by using this valve in the hydraulic line between the pressure side of the pump and the control valve of the auxiliary equipment.

20 Claims, 4 Drawing Figures

LOCKABLE VALVE FOR HYDRAULIC SYSTEM

BACKGROUND OF THE INVENTION

Heavy equipment of the earth moving type or framing type is normally left at the end of a working day in the open at or near the place it has been used. These machines are too heavy and move too slowly to consider driving them to a garage, warehouse, or other building for safekeeping overnight. Such machines are always equipped with an ignition lock but thieves have become adept at bypassing a locked ignition and in readily being able to start the engine of such a vehicle. In more recent times there has been a marked increase in the theft of these heavy equipment vehicles and this had led to the consideration of other means for securing such vehicles from theft. It is an object of this invention to provide a means for blocking the main hydraulic fluid line to prevent its use in moving any of the auxiliary equipment of the vehicle. Thus, in case of a bulldozer the heavy blade could be left on the ground and this would prevent movement of the vehicle even though the ignition were bypassed. In other types of vehicles it would be an added delaying deterrent which might frustrate the thief and cause him to cease further attempts at stealing the vehicle because it would take too much time to make it operate properly.

BRIEF SUMMARY OF THE INVENTION

This invention provides a lockable valve in a hydraulic system comprising a valve body, a cylinder, a piston in the cylinder, and spaced inlet port and two outlet ports entering the valve body communicating with the cylinder, one of such outlet ports leading to a bypass line and the other of such outlet ports leading to an operational hydraulic cylinder. The piston is slidable in the cylinder to selectively close either of such outlet ports. A manually lockable means is provided in the valve to lock piston in the position in which the outlet port to the hydraulic cylinder is closed; and the means is spring biased to close the outlet port leading to the bypass line and to open the outlet port leading to the hydraulic cylinder when the lockable means is unlocked. In one specific embodiment of this invention the piston comprises two spaced heads and the outlet ports are positioned in accordance with the spacing between the piston heads such that when one head covers one outlet port the other of the two outlet ports is open and the inlet port is located between the two outlet ports.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE PREFERRED EMBODIMENT OF THE INVENTION

Figure 1:
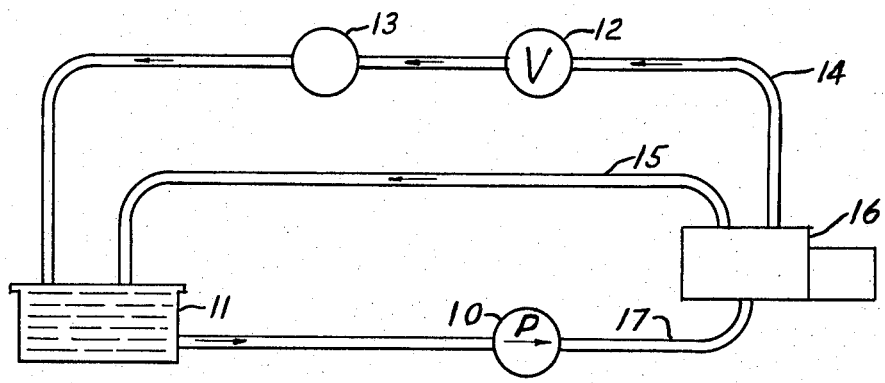
FIG. 1 is a schematic illustration of a hydraulic system employing the lockable valve of this invention.

In FIG. 1 there is shown a simplified schematic illustration of a hydraulic system that may be employed on any of several types of equipment. In all such systems the hydraulic fluid is pressurized by means of pump 10 through an inlet line 17 via control valve 12 to a hydraulic cylinder 13 that may be attached between the frame and any piece of auxiliary equipment mounted with respect to the frame, e.g., a bulldozer blade, a backhoe, etc. The manually operated valve 12 provides the control by which the operator of the equipment can admit fluid to hydraulic cylinder 13 to cause the relative movement of auxiliary equipment with respect to the frame as desired. In order to complete the circuit of hydraulic fluid which is under pressure, the fluid returns from the hydraulic cylinder 13 to a sump 11 which then serves as the feed to pump 10. In the system of the present invention a lockable valve 16 is connected in the line 17 between the manually operated control valve 12 and the pump 10. Lockable valve 16 includes two outlet ports 19 and 20 through which the incoming fluid from line 17 via inlet port 18 can be directed to either of the two outlet lines 14 or 15. Line 14, communicates via manually operated valve 12 to hydraulic cylinder 13. Line 15 serves as a bypass which leads directly to sump 11. Thus, if valve 16 is set to connect inlet line 17 to bypass line 15, the hydraulic fluid will merely circulate through the sump 11 and pump 10. If valve 16 is set to connect inlet line 17 with outlet line 14, the fluid will flow through valve 12 to cylinder 13 for operation of the equipment and then return to sump 11.

Figure 2:
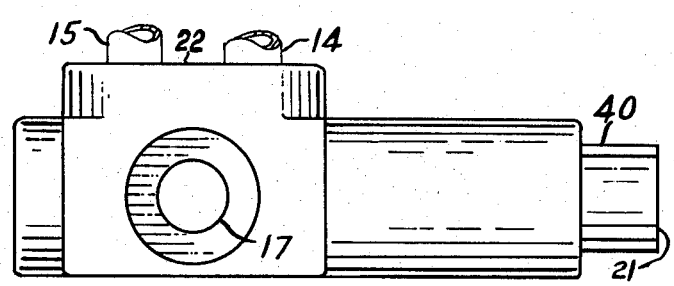
FIG. 2 is a front elevational view of the lockable valve of this invention.
Figure 3:
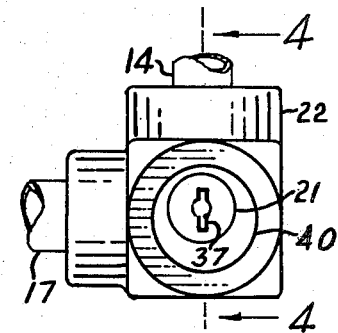
FIG. 3 is an end elevational view of the lockable valve of this invention.
Figure 4:
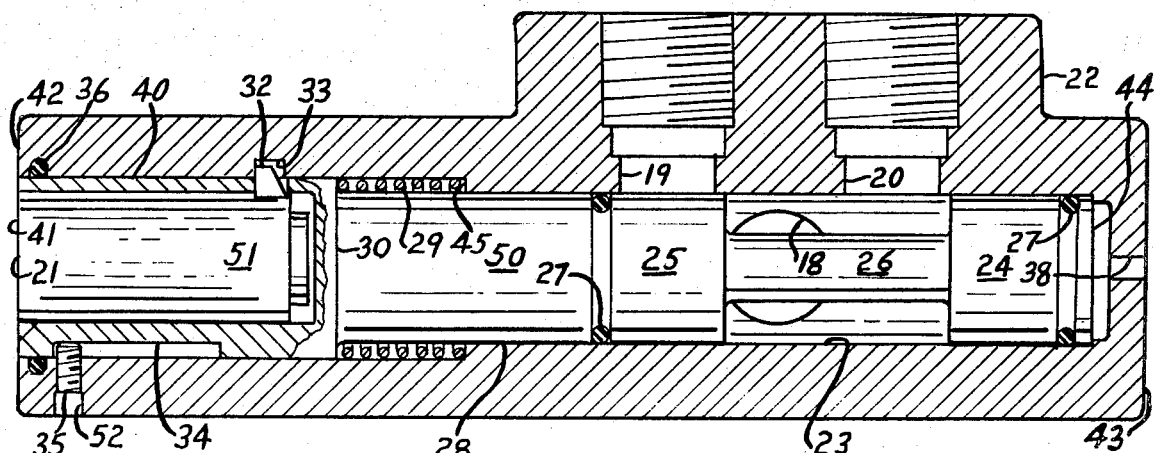
FIG. 4 is a cross section view taken along line 4—4 of FIG. 3.

The details of construction of the lockable valve 16 in accord with this invention are clearly depicted in FIGS. 2-4. The valve 16 includes a valve body 22 having an inlet port 17, two outlet ports 14 and 15 and a manually operated lock 21. In order to follow the same general arrangement as shown in FIG. 1, line 14 leads to an operating hydraulic cylinder 13, and line 15 is the bypass line leading directly to sump 11. Lock 21 in FIG. 2 is in the unlocked position in which the piston portion 40 protrudes outwardly from valve body 22. In the locked position lock 21 is pressed inwardly and locked so that the key end 40 is substantially flush with the valve body end 42. Lock 21 is any type of manually operated lock, the variety shown here being a key operated lock as illustrated by key slot 37. A combination lock or other type lock may be employed so long as the operator is able to lock or unlock it and the lock body can be pressed inwardly into body 22 and the barrel 40 is sufficiently long to accommodate the throw of the valve piston 50.

The cross sectional view shown in FIG. 4 will more clearly disclose the preferred embodiment of this invention. Valve body 22 contains a cylinder 23 which communicates with the outside of valve body 22 by means of inlet port 18 and two outlet ports 19 and 20. Inlet port 18 is joined to inlet line 17 of FIG. 1 while outlet ports 19 and 20 are respectively joined to line 14 which leads to an operating hydraulic cylinder and to bypass line 15.

Cylinder 23 houses a piston 50 which slides lengthwise within cylinder 23 to various positions to accomplish the intended purposes in accord with this invention. The piston 50 comprises an inner head 24 joined to an outer head 25 by a connecting rod 26 which is considerably smaller in diameter than heads 24 or 25. The two heads 24 and 25 are spaced apart in accordance with the locations of ports 18 and 19. Although other arrangements may be provided to accomplish similar results, in accord with the preferred embodiment of this invention the ports are arranged so that inlet port 18 is positioned between the two outlet ports 19 and 20 and with the spacing between heads 24 and 25 such that each head can be positioned to cover its respective outlet port and leave the other two ports open. For example, in the position shown in FIG. 4 outer head 25 covers outlet ports 19 and inner head 24 at the same time is so positioned that both inlet port 18 and outlet port 20 are open. Thus in such position hydraulic fluid from pump 10 enters through inlet port 18 and leaves through outlet port 20 to bypass line 14 and thence recirculate through sump 11 and pump 10. The second position of piston heads 24 and 25 is accomplished by unlocking lock 21, causing the spring 29 to move piston heads 24 and 25 to the left, as viewed in FIG. 4, until inner piston head 24 covers outlet port 20. In such a position outer piston head 25 has moved sufficiently far to the left such that both inlet port 18 and outlet port 19 has uncovered. In this position hydraulic fluid from pump 10 and line 17 enters inlet port 18 and leaves outlet port 19 to operating line 14 which leads via valve 12 to hydraulic cylinder 13 and thereafter recirculates through sump 11 and pump 10. Thus, the valve of this invention is designed to operate in either of two positions of the piston 50 in cylinder 23, one in the locked position shown and the other with head 24 blocking outlet port 20 with outlet port 19 unblocked.

Both piston heads 24 and 25 are sealed by any convenient means such as O-rings 27 to prevent undue leakage of hydraulic fluid past the piston heads into the cylinder. Vent 38 is provided through the valve body end 43 communicating with cylinder 23 adjacent piston end 44 to prevent any vacuum buildup upon movement of the piston, 50 towards or away from the cylinder end 43. Piston portion or extension 28 is encircled by a helical spring 29 which is biased to force piston extension 28 to the left as shown in FIG. 4. Since piston extension 28 is connected and preferably integral with piston heads 24 and 25, any movement of piston extension 28 is directly transferred to piston heads 24 and 25. Flange 30 on piston extension 28 extends laterally therefrom and functions as a seat for one end of spring 29 while the other end is seated on a circumferential shoulder 45 formed by an enlarged bore in valve body 22 to accommodate spring 29. In bore 31 at the forward end of piston extension 28 there is fitted the body 51 of manually operated lock 21. The lock body 51 is shown to be generally cylindrical and has a locking dog 32 which projects into recess 33 in valve body 22 when in the locked position. Any movement, except for minor play between the parts is thus inhibited in either direction of motion of the piston 50. When the key is inserted into slot 37 and used to unlock the mechanism, dog 32 retracts and the compression force of spring 29 is then permitted to operate freely to cause the piston 50 to move outwardly of the valve body 22. The spring 29 forces piston head 28 carrying lock 21 outwardly to the left so that it projects beyond the end of valve body 22 to the position generally shown in FIG. 2. The amount of travel is limited by a keyway 34 cooperating with set screw 35 in valve body 22. To prevent detection and tampering by a thief attempting to break this lock, set screw 35 is preferably countersunk and the depression 52 filled with solder or the like. The outer limits of piston extension 28 are sealed against dirt entering into the mechanism and against any oil lubrication leakage by any suitable means such as O-ring 36. Lock 21 is preferably sufficiently elongated so that dog 32 will be well within the confines of valve body 22 at all times and thus substantially protected from any accumulation of dirt or debris which might interfere with the lock's working mechanism.

In the operation of the valve of this invention, it may be seen that the operator of the equipment must have not only an ignition lock key to start the engine and thereby provide power for pump 10 and for movement of the vehicle, he must also have a key to unlock the locking mechanism 21 in order to operate any of the auxiliary equipment of the vehicle. When the valve is locked in the position shown in FIG. 4, the piston heads 24 and 25 are held in the position such that hydraulic fluid from pump 10 circulates only through the bypass line 15 and is not capable of providing pressurized fluid to operate any of the auxiliary equipment. As soon as lock 21 is unlocked, the hydraulic fluid is then available to operate that auxiliary equipment. When this invention is used in connection with heavy earth moving equipment, the vehicle preferably will be locked at the end of the day with a heavy arm or blade of the auxiliary equipment resting on the ground or somehow under load, and thus serve as an anchor or deterrent against movement of the vehicle until that arm or blade is lifted or relieved from its load which cannot be accomplished until the valve of this invention is unlocked or other detrimental action is taken by the thief which would greatly impede the successful theft thereof.

It is recognized that other arrangements of piston heads and ports in the valve of this invention may be employed to accomplish a similar purpose. Preferably the use of two spaced piston heads with outlet ports on either side of the inlet port permits the objective to be accomplished with a similar valve. Furthermore even in equipment which has an automatic small bypass around the pump whenever the pressure in the hydraulic line goes beyond a maximum setting, such bypass will cause pumpe failure if the excess pressure continues beyond a small time interval. The valve of this invention protects the pump by making sure that an outlet, or momentarily both outlets, are open at all times during operation of the pump. While in theory it may be possible to merely close and open the inlet port rather than having the two outlet ports and valve heads in accord with this invention, pump safety and protection would be sacrificed.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what is desired to secure by Letters Patent of the United States is:

1. A lockable valve in a fluid system comprising a unitary valve body, a cylinder within said valve body, a piston disposed in said cylinder, only three ports communicating between the outside of said body and said cylinder, one said port being an inlet port through which fluid is to be pumped into said cylinder, the other two of said ports being outlet ports for selective withdrawal of the fluid from said cylinder, one of said outlet ports being adapted to be a bypass line connected to a fluid sump and the other of said outlet ports being adapted to be coupled to a control valve of an operational fluid cylinder, said piston being unmovable by the pressure of the fluid in said cylinder and manually movable in said cylinder to selectively fully close either of said outlet ports, a manually lockable means located within said valve body and mechanically coupled to said piston to lock said piston in one position to close said other outlet port with said one outlet port being open, said lockable means including a spring biasing said piston in a direction to close said other outlet port and to open said one outlet port when said lockable means is unlocked and manually released, said inlet port being in communication only with a respective one of each of said outlet ports in said locked position and said unlocked position.

2. The valve of claim 1 wherein said piston comprises two spaced heads movable in said cylinder, and said ports located such that when one of said heads covers either of said outlet ports, the second outlet port is uncovered by the second of said heads and said inlet port is uncovered when either of said outlet ports is fully uncovered.

3. The valve of claim 1 wherein said piston comprises two spaced piston heads slidably mounted in said cylinder for respectively sealing said outlet ports, spaced mounting means on the piston with said piston heads therebetween for sealing said piston within said cylinder to prevent undue leakage of fluid between said piston and said cylinder, said piston heads being rigidly joined to each other by a shaft substantially smaller in diameter than said cylinder.

4. The valve of claim 1 wherein said two outlet ports are spaced longitudinally along said cylinder and said inlet port being positioned between said two outlet ports.

5. The valve of claim 1 wherein said valve body includes a housing extending laterally thereof, a bore larger in diameter than said cylinder in said housing, a spring mounted in said bore and having one end engaged with said valve body and the other end engaged with said piston for spring loading said piston, said spring causing an end of said piston to extend outwardly of said housing, said manually operable lock means being operable to lock said piston and said lock means in substantially fully retracted position within said housing.

6. The valve of claim 5 wherein said piston includes an elongated keyway therealong, means connected to said housing entering said keyway for limiting the travel of said piston.

7. The valve of claim 6 wherein said lockable means includes a lock mechanism mounted within said piston and having a locking dog, said housing having a recess for receiving said locking dog when said piston is substantially fully retracted within said housing.

8. The valve of claim 7 wherein said lock mechanism is spring loaded to lock upon alignment of said dog and recess.

9. The valve of claim 1 wherein said lockable means is spring loaded in a direction to unlock same and in the opposite direction to be automatically locked in said one position.

10. The valve of claim 1 wherein said piston is movable between its locked and unlocked positions without causing any increase in back pressure of the fluid being pumped therethrough.

11. A lockable valve in a fluid line comprising an elongated unitary housing containing a lengthwise cylindrical bore open at one end and closed at the other end and only three spaced bores adjacent said closed other end communicating between said lengthwise bore and the outside of said housing, said three bores being spaced apart from each other along the axis of said lengthwise bore to form an outlet bore, an inlet bore and an outlet bore, said inlet bore permitting the ingress of fluid therethrough into said lengthwise bore, said outlet bores permitting the selective withdrawal of fluid from said lengthwise bore; one said outlet bore being connectable to a bypass line connected to a fluid sump and the other said outlet bore being connectable to a control valve of a operational fluid cylinder;

a piston unmovable by the pressure of the fluid in said cylinder and manually movably mounted in said lengthwise bore having a first head and a second head whose outer surface sealingly fit within the interior surface of said lengthwise bore, a rigid portion spaced inwardly from said outer surface for joining said first and second heads; said first and second heads having a width sufficient to close respective said outlet bores, said heads being spaced such that when said first head is positioned to fully close said one outlet bore the remaining other outlet bore is open, and when said second head is positioned to fully close said other outlet bore the remaining said one outlet bore is open;

said second piston head including a forward portion rigidly attached and extending therefrom to said outside of said housing along said lengthwise bore;

a spring mounted in said housing and biased to urge said forward portion of said second piston head toward said outside of said housing;

selective locking means located within said unitary housing and mounted on said forward portion of said second head to lock same to said housing with said forward portion and said locking means in a fully retracted position within said housing whereby said second head closes said other outlet bore and to unlock said piston and cause said spring means to force said piston forward portion to a fully extended position whereby said first head closes said one outlet bore, said inlet bore being in communication only with a respective one of each of said outlet bores in said locked position and said unlocked position.

12. The valve of claim 11 further comprising means for sealing said piston to prevent undue leakage of fluid from the space between said piston heads during movement of said piston within said lengthwise bore.

13. The valve of claim 11 wherein said closed other end includes a small air vent communicating with the outside of said housing to permit said piston to freely slide within said lengthwise bore.

14. The valve of claim 11 wherein said spring is defined by a helical spring encircling said piston forward portion, said housing including a spring bore larger in diameter than said lengthwise bore to accommodate said spring therein, said piston forward portion including a flange spaced from a shoulder of said spring bore with said spring ends juxtaposed respectively on said flange and said shoulder.

15. The valve of claim 11 wherein said piston includes an elongated keyway therealong, means connected to said housing entering said keyway for limiting the travel of said piston.

16. The valve of claim 15 wherein said locking means includes a lock mechanism mounted within said piston and having a locking dog extending outwardly from said piston, said housing having a recess for receiving said locking dog when said piston is substantially fully retracted within said housing.

17. The valve of claim 16 wherein said lock mechanism is spring loaded to lock upon alignment of said dog and recess.

18. The valve of claim 11 wherein said piston is movable between its locked and unlocked positions without causing any increase in back pressure of the fluid being pumped therethrough.

19. The valve of claim 18 wherein said housing includes an air vent communicating with said lengthwise bore adjacent said closed other end to permit said piston to freely slide therewithin.

20. In a hydraulic fluid system including a hydraulic fluid reservoir, a hydraulic fluid pump, a selective control valve, a hydraulic line between the control valve and the pump, hydraulic means selectively powered via the selective control valve by the hydraulic fluid pressurized by the hydraulic fluid pump from the hydraulic fluid reservoir, the improvement comprising a selectively lockable valve having only three ports including a first inlet port connected to said hydraulic line on the pump side thereof and second and third selective outlet ports, said second outlet port being connected to said hydraulic line on the control valve side thereof, a bypass hydraulic line connected between said outlet port and said reservoir, said lockable valve including a unitary housing and valve means located therewithin, said valve means in the locked condition thereof blocking said second outlet port such that all of the hydraulic fluid from said pump through said first inlet port passes via said third outlet port through said bypass line into said reservoir, said valve means being manually movable to its unlocked condition thereof blocking said third outlet port such that all of the hydraulic fluid from said pump through said first inlet port passes via said second port through said control valve for selectively powering said hydraulic means and thence into said reservoir, said valve means being unmovable by the pressure of the hydraulic fluid in said valve and manually movable between its locked and unlocked conditions, and lock means located within said unitary housing to lock said lockable valve in the locked condition to bypass the hydraulic fluid therethrough, said inlet port being in communication only with a respective one of each of said outlet ports in said locked condition and said unlocked condition.

* * * * *